United States Patent
Nelogal et al.

(10) Patent No.: US 10,437,477 B2
(45) Date of Patent: Oct. 8, 2019

(54) SYSTEM AND METHOD TO DETECT STORAGE CONTROLLER WORKLOADS AND TO DYNAMICALLY SPLIT A BACKPLANE

(71) Applicant: DELL PRODUCTS, LP, Round Rock, TX (US)

(72) Inventors: Chandrashekar Nelogal, Round Rock, TX (US); Yogesh P. Kulkarni, Round Rock, TX (US); Sanjeev Dambal, Austin, TX (US); Sundar Dasar, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 85 days.

(21) Appl. No.: 15/655,294

(22) Filed: Jul. 20, 2017

(65) Prior Publication Data

US 2019/0026022 A1    Jan. 24, 2019

(51) Int. Cl.
*G06F 3/06*         (2006.01)

(52) U.S. Cl.
CPC ............ *G06F 3/061* (2013.01); *G06F 3/0604* (2013.01); *G06F 3/0614* (2013.01)

(58) Field of Classification Search
CPC ....... G06F 3/061; G06F 3/0604; G06F 3/0614
See application file for complete search history.

(56) References Cited

U.S. PATENT DOCUMENTS

| | | | |
|---|---|---|---|
| 7,363,453 B1* | 4/2008 | Aman | G06F 3/061 707/999.002 |
| 8,180,979 B2* | 5/2012 | Innan | G06F 3/0605 711/154 |
| 8,195,854 B1* | 6/2012 | Sihare | G06F 3/061 710/74 |
| 8,201,169 B2 | 6/2012 | Venkitachalam et al. | |
| 2004/0059957 A1 | 3/2004 | Menasce et al. | |
| 2008/0126885 A1 | 5/2008 | Tangvald et al. | |
| 2009/0177860 A1* | 7/2009 | Zhu | G06F 3/0613 711/173 |
| 2012/0179846 A1* | 7/2012 | Haustein | G06F 3/061 710/38 |
| 2013/0151774 A1* | 6/2013 | Bolik | G06F 3/0604 711/118 |
| 2014/0108759 A1 | 4/2014 | Iwamitsu et al. | |
| 2014/0142725 A1* | 5/2014 | Boyd | G05B 19/0421 700/28 |
| 2015/0324135 A1* | 11/2015 | Chan | G06F 3/061 711/114 |

* cited by examiner

Primary Examiner — Tasnima Matin
(74) Attorney, Agent, or Firm — Larson Newman, LLP (57) ABSTRACT

An information handling system includes storage drives, a first storage controller configured to map to a first subset of the storage drives, a second storage controller configured to map to a second subset of the storage drives different from the first subset, and a BMC. The BMC directs the storage controllers to detect storage traffic to the first and second subsets of storage drives, compares the storage traffic from the storage controllers, and remaps the first storage controller to map storage transactions on a third subset of the storage drives different from the first subset when the comparison indicates that the first storage traffic is greater than the second storage traffic.

16 Claims, 4 Drawing Sheets

SYSTEM AND METHOD TO DETECT
STORAGE CONTROLLER WORKLOADS
AND TO DYNAMICALLY SPLIT A
BACKPLANE

FIELD OF THE DISCLOSURE

This disclosure generally relates to information handling systems, and more particularly relates to detecting storage controller workloads and to dynamically splitting a backplane.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include storage drives, a first storage controller configured to map to a first subset of the storage drives, a second storage controller configured to map to a second subset of the storage drives different from the first subset, and a baseboard management controller (BMC). The BMC may direct the storage controllers to detect storage traffic to the first and second subsets of storage drives, compare the storage traffic from the storage controllers, and remap the first storage controller to map storage transactions on a third subset of the storage drives different from the first subset when the comparison indicates that the first storage traffic is greater than the second storage traffic.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
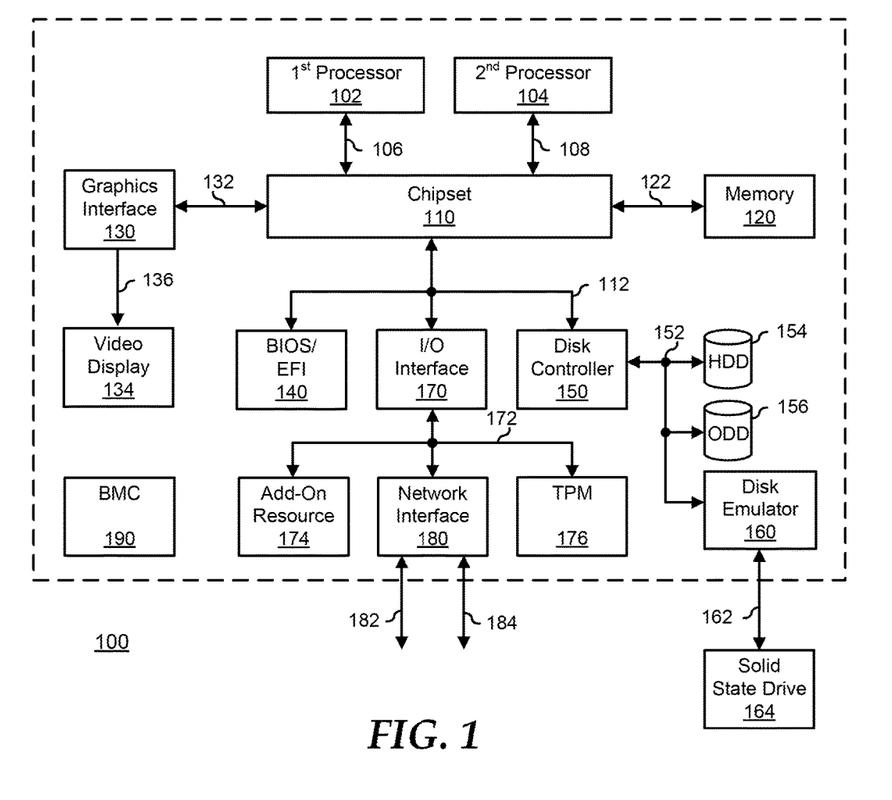
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the information handling system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 164, an input/output (I/O) interface 170, one or more add-on resources 174, a trusted platform module (TPM) 176, a network interface 180, and a baseboard management controller (BMC) 190. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100, and BMC 190 provides a management environment for the information handling system.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a Serial Attached SCSI (SAS) interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100. In a particular embodiment, information handling system 100 includes two or more disk controllers similar to disk controller 150.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Multi-Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 represents one or more processing devices, such as a dedicated BMC System-on-a-Chip (SoC) device, one or more associated memory devices, one or more network interface devices, and the like, that operate together to provide the management environment for information handling system 100. In particular, BMC 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. BMC 190 can include a network connection to an external management system, and the BMC can report status information for information handling system 100, receive BIOS/UEFI or system firmware updates, or other control information for managing and controlling the operation of the information handling system. BMC 190 can operate off of a separate power plane from the components of the host environment so that the BMC receives power to manage information handling system 100 when the information handling system is otherwise shut down. An example of BMC 190 includes a commercially available BMC product that operates in accordance with an Intelligent Platform Management Initiative (IPMI) specification, such as a Integrated Dell Remote Access Controller (iDRAC), or the like.

Figure 2:
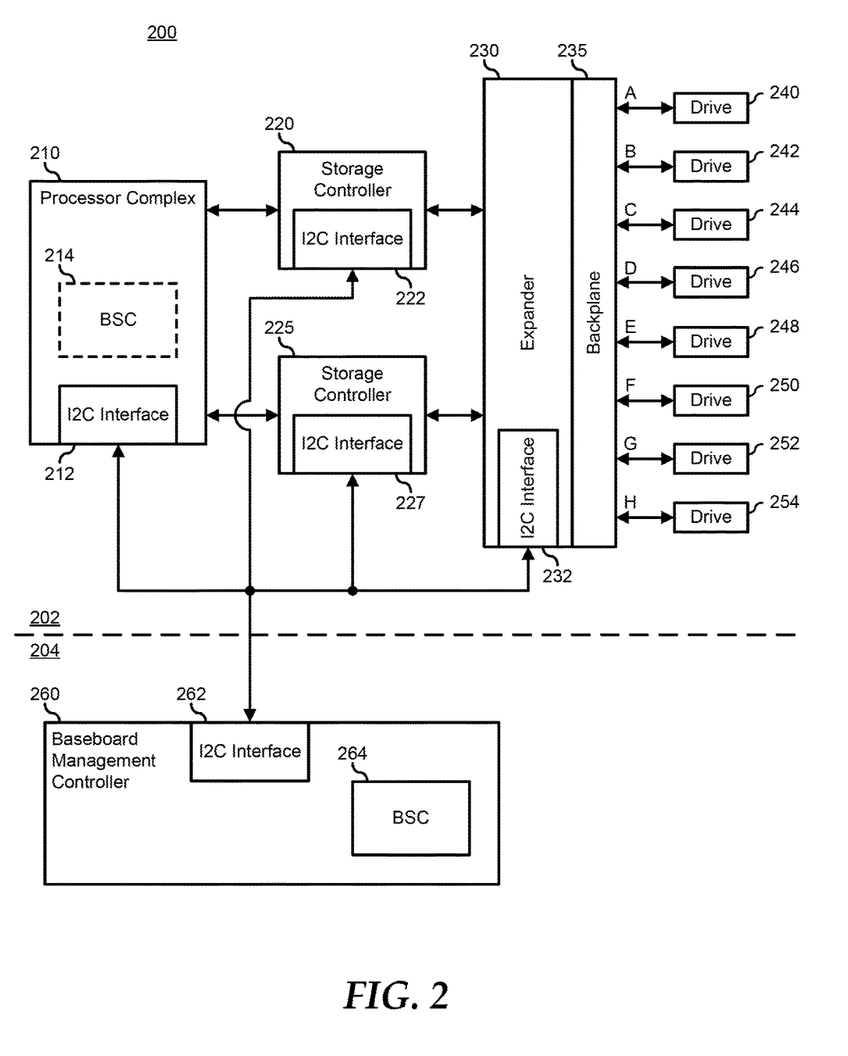
FIG. 2 is a block diagram illustrating an information system according to an embodiment of the present disclosure.

FIG. 2 illustrates an information handling system 200 according to an embodiment of the present disclosure. Information handling system 200 includes a host environment 202 and a management environment 204. Host environment 202 includes a processor complex 210, a storage controller 220, one or more additional storage controllers 225, an expander 230, a backplane 235, storage drives 240, 242, 244, 246, 248, 250, and 252, and one or more additional storage drives 254. Management environment 204 includes a baseboard management controller (BMC) 260. Host environment 202 operates to provide data processing functionality of information handling system 200, such as is typically associated with an information handling system. As such, processor complex 210 represents a data processing apparatus, such as one or more central processing units (CPUs) or processor cores, and the associated data input and output I/O functionality, such as a chipset component or another I/O processor component. Processor complex 210 operates to execute machine-executable code to perform the data processing tasks associated with information handling system 200.

Storage controllers 220 and 225 each operate to manage one or more of storage drives 240, 242, 244, 246, 248, 250, 252, and 254, by providing mappings of the physical storage media of the storage drives to logical units that can be accessed by processor complex 210. As such, storage controllers 220 and 225 receive data storage transactions from processor complex 210 that are addressed to the various logical units, and the storage controllers execute the data storage transactions on the associated physical storage media of storage drives 240, 242, 244, 246, 248, 250, 252, and 254. Storage controllers 220 and 225 may implement a scheme for providing a Redundant Array of Independent Drives (RAID) functionality across one or more of the associated storage drives 240, 242, 244, 246, 248, 250, 252, and 254. Here, storage controllers 220 and 225 will map a single logical unit to a RAID array that includes multiple storage drives. Further, storage controllers 220 and 225 may partition one or more of storage drives 240, 242, 244, 246, 248, 250, 252, and 254 into multiple logical units. However, for the sake of simplicity, information handling system 200 is illustrated such that storage drive 240 is mapped as a logical "A" drive, storage drive 242 is mapped as a logical "B" drive, storage drive 244 is mapped as a logical "C" drive, storage drive 246 is mapped as a logical "D" drive, storage drive 248 is mapped as a logical "E" drive, storage drive 250 is mapped as a logical "F" drive, storage drive 252 is mapped as a logical "G" drive, and storage drive 254 is mapped as a logical "H" drive.

Storage controllers 220 and 225 are each connected to processor complex 210 via a high-bandwidth communication interface, such as a four-lane (×4) PCIe link, an eight-lane (×8) PCIe link, a sixteen-lane (×16) PCIe link, or another high-bandwidth communication interface. Storage controllers 220 and 225 each operate in accordance with a particular storage fabric that is compatible with expander 230, backplane 235, and storage drives 240, 242, 244, 246, 248, 250, 252, and 254. An example of a storage fabric includes a Serial Attached SCSI (SAS) fabric, a Serial-ATA (SATA) fabric, a Fibre Channel fabric, a PCIe fabric, or another storage fabric, as needed or desired.

Expander 230 operates to increase the number of physical storage drives that can be connected to each of storage controllers 220 and 225. For example, in a typical configuration, a storage controller may provide a native capacity to control no more than eight (8) storage drives, while an expander may provide a fan-out such that up to 128 storage drives may be attached and controlled by a single storage controller. Here, expander 230 is connected to both of storage controllers 220 and 230, and operates to permit the storage controllers to control a greater number of storage drives. Further, expander 230 operates to switch controllers 220 and 225 to their respective storage drives 240, 242, 244, 246, 248, 250, 252, and 254. Note that, as illustrated, information handling system 200 includes eight storage drives 240, 242, 244, 246, 248, 250, 252, and 254, but it will be understood that the eight storage drives may be representative of a greater or a lesser number of storage drives, as needed or desired.

Backplane 235 represents an electromechanical element of information handling system 200 that provides for the electrical connectivity to storage drives 240, 242, 244, 246, 248, 250, 252, and 254. In particular, storage drives 240, 242, 244, 246, 248, 250, 252, and 254 are typically removable elements of information handling system 200 that are configured to plug into separate receptacles in a chassis of the information handling system. Each receptacle will typically include power connections to power storage drives 240, 242, 244, 246, 248, 250, 252, and 254, and data connections that are configured in backplane 235 to connect to a particular port of expander 230. As such, each one of storage drives 240, 242, 244, 246, 248, 250, 252, and 254 are uniquely mapped to one of the ports of expander 235. In a particular embodiment, backplane 235 also provides a mechanical attachment mechanism for securing each of storage drives 240, 242, 244, 246, 248, 250, 252, and 254 to the chassis of information handling system 200.

Storage drives 240, 242, 244, 246, 248, 250, 252, and 254 represent various data storage devices that each are provided with a data interface that operates in accordance with the fabric implemented by storage controllers 220 and 225, expander 230, and backplane 235. For example, storage drives 240, 242, 244, 246, 248, 250, 252, and 254 can operate in accordance with the SAS fabric, the SATA fabric, the Fibre Channel fabric, or another storage fabric, as needed or desired. Storage drives 240, 242, 244, 246, 248, 250, 252, and 254 can represent a common storage drive configuration, or can represent various combinations of different storage drive configurations. For example, one or more of storage drives 240, 242, 244, 246, 248, 250, 252, and 254 may represent hard disk drives, tape drives, solid state drives, or other storage devices as needed or desired. As noted above, for the purpose of this disclosure, storage drives 240, 242, 244, 246, 248, 250, 252, and 254 are each represented on information handling system 200 as respective logical units A-H, but this is not necessarily so.

Data storage and retrieval operations are managed in information handling system 200 under a Basic Input/Output System or a Unified Extensible Firmware Interface (hereinafter referred to as a system BIOS/UEFI), and under an operating system (OS) based upon the logical units A-H. Thus, in order to successfully direct data storage and retrieval transactions to the correct logical unit, the system BIOS/UEFI retains a mapping of which logical units are managed by which of storage controllers 220 and 225. Further, storage controllers 220 and 225 retain mapping information for which logical units, and by extension which of storage drives 240, 242, 244, 246, 248, 250, 252, and 254, are managed by each storage controller. Finally, expander 230 implements the mapping between storage controllers 220 and 225 and storage drives 240, 242, 244, 246, 248, 250, 252, and 254 by correctly routing transactions from the storage controllers to the mapped storage drives.

Typically, the mapping information that is implemented by processor complex 210, by storage controllers 220 and 225, and by expander 230 is determined by the system BIOS/UEFI based upon various settings and configurations that are predetermined during a system boot process. In a particular embodiment, information handling system 100 is configured to provide one of several predetermined mappings. For example, a first predetermined mapping may map logical units equally between storage controllers 220 and 225. Here, logical units A-D may be mapped to storage controller 220 and expander 230 may be configured to route storage and retrieval transactions from storage controller 220 to storage drives 240, 242, 244, and 246. Here further, logical units E-H may be mapped to storage controller 225 and expander 230 may be configured to route storage and retrieval transactions from storage controller 225 to storage drives 248, 250, 252, and 254. Other examples may include a second predetermined mapping that maps logical units A and B to storage controller 220 and that maps logical units C-H to storage controller 225, a third predetermined mapping that maps logical units A-F to storage controller 220 and that maps logical units G and H to storage controller 225, or other predetermined mappings, as needed or desired.

Management environment 204 operates to implement and manage various maintenance, operation, and system update processes for information handling system 200 that are not typically associated with the data processing functionality of the information handling system. For example, management environment 204 may provide for out-of-band management of the various code executed on host environment 202, such as BIOS code or UEFI code, firmware code, programs, applications, operating systems, and the like. In particular, management environment 204 can operate on a different power plane than host environment 202, such that the management environment can download and store updated code for the host environment, even when the host environment is powered off. Management environment 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. As such, management environment 204 represents one or more elements that provide a co-processor complex of information handling system 200 that performs the update, monitoring, and maintenance functions of the management environment. BMC 260 represents the main service processor of management environment 204.

Processor complex 210 includes an Inter-Integrated Circuit (I2C) interface 212, storage controller 220 includes an I2C interface 222, storage controller 225 includes an I2C interface 227, SAS expander 230 includes an I2C interface 232, and BMC 260 includes an I2C interface 262. I2C interfaces 212, 222, 227, 232, and 262 each represent one or more multi-master/multi-slave serial communication busses that provide relatively low speed, between 100 kilobits per second (kbits/s) and 1 megabits per second (mbits/s) or more, data communications between processor complex 210, storage controllers 220 and 225, SAS expander 230, and BMC 260. The I2C busses are typically utilized to pass various management information between the elements of information handling system 200 that is utilized by BMC 260 to perform the various update, monitoring, and maintenance functions of management environment 204. BMC 260 includes a network interface, not shown, that permits management environment 204 to connect to a management system external to information handling system 200 to receive update and maintenance information from the management system, and to provide monitoring information to the management system. The mechanisms and method of system management via a service processor such as BMC 260 are known in the art and are beyond the scope of the present disclosure, and will not be further elaborated upon herein, except as needed to elaborate the present disclosure.

In a particular embodiment, information handling system 200 operates to detect the data storage traffic that is handled by storage controllers 220 and 225. The data storage traffic through storage controller 220 is compared with the data storage traffic through storage controller 225 to determine whether on not one of the storage controllers is handling a greater portion of the data storage traffic for information handling system 200. If one of storage controllers 220 and 225 is handling a much greater portion of the data storage traffic, then information handling system 200 operates to dynamically remap storage drives 240, 242, 244, 246, 248, 250, 252, and 254 among the storage controllers to better balance the data storage traffic between the storage controllers. Data storage traffic in storage controllers 220 and 225 may be measured as a number of data storage transactions handled by each storage controller, as an amount of data transferred by each storage controller, as an average data transfer bandwidth for each storage controller over a particular period of time, or by another data storage traffic measurement, as needed or desired.

In a particular embodiment, BMC 260 includes a backplane split configurator 264 that operates to direct storage controllers 220 and 225 to detect the data storage traffic that is handled by the storage controllers via management transactions initiated by the BMC on I2C interface 262 to I2C interfaces 222 and 227. Here, storage controllers 220 and 225 are configured to detect the data storage traffic at the direction of BMC 260. When storage controllers 220 and 225 have accumulated the information on their respective data storage traffic, the storage controllers respond to management transactions by providing their respective information via I2C interface 222 and 225 back to I2C interface 262. Backplane split configurator 264 then compares the data storage traffic information from storage controller 220 with the data storage traffic information from storage controller 225 to determine whether on not one of the storage controllers is handling a greater portion of the data storage traffic for information handling system 200. An example of data storage traffic can include a number of I/O transactions or I/O transactions per second, a bandwidth, such as mega-bytes per second, latency distribution, average latency, or another measure of data storage traffic as needed or desired.

If one of storage controllers 220 and 225 is handling a much greater portion of the data storage traffic, then backplane split configurator 264 determines an optimized configuration for the split of storage drives 240, 242, 244, 246, 248, 250, 252, and 254 between storage controllers 220 and 225, and reconfigures host environment 202 to implement the optimized configuration by remapping the logical units to different storage controllers. In particular, backplane split configurator 264 operates to direct processor complex 210 to remap the logical units to storage controllers 220 and 225 via a management transaction initiated by the BMC on I2C interface 262 to I2C interface 212. Here, processor complex 210 can implement the remapping by modifying driver settings of storage controllers 220 and 225 in the system BIOS/UEFI. Backplane split configurator 264 further operates to direct storage controllers 220 and 225 to implement the mapping of logical units as necessitated by the optimized configuration via further management transactions initiated by the BMC on I2C interface 262 to I2C interfaces 222 and 227. Finally, backplane split configurator 264 operates to reconfigure expander 230 to remap storage drives 240, 242, 244, 246, 248, 250, 252, and 254 to the associated storage controllers 220 and 225 in accordance with the mapping of the optimized configuration.

In a particular embodiment, backplane split configurator 264 determines whether or not one of storage controllers 220 and 225 are handling a greater portion of the data storage traffic for information handling system 200 based upon a predetermined balance threshold, such that if the data storage traffic in one storage controller differs from the data storage traffic in the other storage controller by less than the balance threshold, then no remapping is performed on host environment 202. On the other hand, if the data storage traffic in one storage controller differs from the data storage traffic in the other storage controller by greater than the balance threshold, then the remapping is performed on host environment 202 as described above.

As a particular example, backplane split configurator 264 can operate to direct a periodic analysis of the data storage traffic in information handling system 200. For example, backplane split configurator 264 can direct storage controllers 220 and 225 to collect data storage traffic information on a periodic basis and for a particular amount of time. Here, data storage traffic information can be collected every 30 minutes, every hour, every two hours, or another period of time, and the information can be acquired over a 30 second time span, a one minute time span, a two minute time span, or another time span. Further, backplane configurator 264 can operate to perform periodic remapping of the data storage traffic in information handling system 200. For example, backplane split configurator 264 can perform remapping on information handling system 200 ever day, every other day, every seven days, or on a different periodic basis. In another embodiment, backplane split configurator 264 can operate on an on-demand basis, where a direction is received by BMC 260 to perform the operations to detect the data storage traffic and to remap storage drives 240, 242, 244, 246, 248, 250, 252, and 254. For example, BMC 260 may receive a command from the management system external to information handling system 200.

In a particular embodiment, backplane split configurator 264 operates in one of several different modes. In a first, dynamic, mode, backplane split configurator 264 automatically performs a remapping on information handling system 200 whenever a new optimized configuration is created based upon the data storage traffic information from storage controllers 220 and 225, as described above. In a second mode, backplane split configurator 264 schedules a remapping at a later time. For example, if a new optimized configuration is created during a peak operating time for information handling system 200, then backplane split configurator 264 can schedule a remapping of the information handling system at a later time when data storage traffic is decreased. In a third mode, backplane split configurator 264 operates only to provide an alert to the management system when one of storage controllers 220 and 225 are handling a greater portion of the data storage traffic for information handling system 200. Note that the third mode can be combined with either of the first or second modes, such that an alert is provided to the management system either when information handling system 200 is remapped, or when a remapping on the information handling system is scheduled to be performed.

Note that other agents of information handling system 200 can operate to detect the data storage traffic that is handled by storage controllers 220 and 225, and to remap storage drives 240, 242, 244, 246, 248, 250, 252, and 254 among the storage controllers to better balance the data storage traffic between the storage controllers, as needed or desired. For example, processor complex 210 is illustrated as including a backplane split configurator 214. In a particular embodiment, backplane split configurator 214 is similar to backplane split configurator 264 and operates as described above. However, in this embodiment, rather than utilizing a management network of I2C interfaces 212, 222, 227, 232, and 262, backplane split configurator 214 operates via in-band communications. Here, backplane split configurator 216 operates to direct storage controllers 220 and 225 to collect the data storage traffic and to receive the data storage traffic information via the high-bandwidth communication interfaces between processor complex 210 and the storage controllers. Further, backplane split configurator reconfigures host environment 202 with optimized configurations via in-band communications. For example, backplane split configurator 214 can operate to remap the logical units within processor complex 210 by modifying driver settings of storage controllers 220 and 225 in the system BIOS/UEFI, to direct storage controllers 220 and 225 to implement the mapping of logical units as necessitated by the optimized configurations via the high-bandwidth communication interfaces between the processor complex and the storage, and to reconfigure expander 230 to remap storage drives 240, 242, 244, 246, 248, 250, 252, and 254 to the associated storage controllers through the storage controllers.

In the embodiment that utilizes backplane split configurator 264, the operations to detect the data storage traffic and to remap storage drives 240, 242, 244, 246, 248, 250, 252, and 254 have the advantage of operating out-of-band, that is, without utilizing processor cycles and data bandwidth of host environment 202. On the other hand, the embodiment that utilizes backplane split configurator 216 can be implemented on an information handling system that does not include a management environment similar to management environment 204. The skilled artisan will recognize, based upon the above, that other configurations of the operations to detect the data storage traffic and to remap storage drives 240, 242, 244, 246, 248, 250, 252, and 254 may be provided, as needed or desired. For example, a BMC may receive direction to initiate an evaluation of the data storage traffic on an information handling system. In response, the BMC may direct the storage controllers to collect the data storage traffic information, may receive and evaluate the data storage traffic information, and may determine a new optimized configuration. Then the BMC may provide the new optimized configuration to the processor complex of the information handling system, and the processor complex may perform the operations to implement the optimized configuration. Other divisions of the operations may be utilized, as needed or desired.

Figure 3:
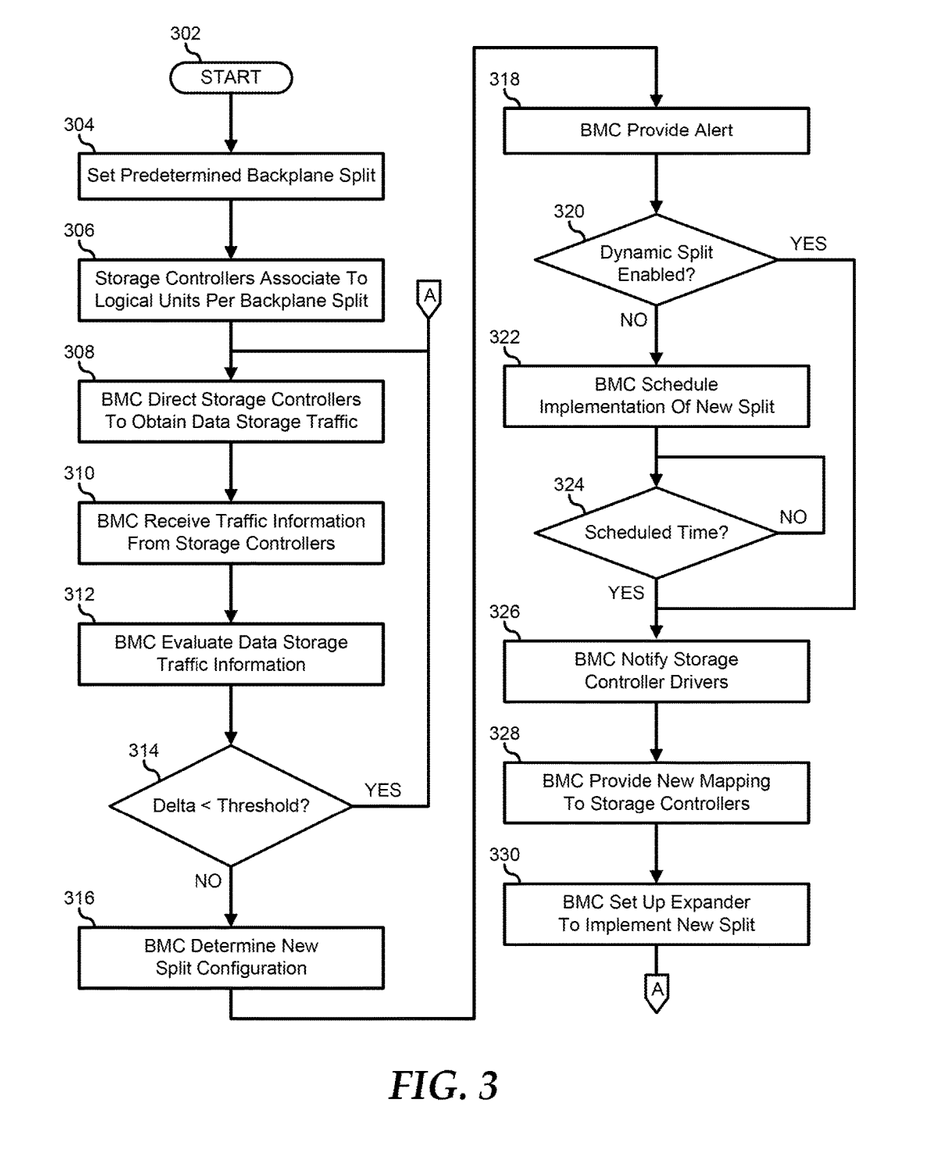
FIG. 3 is a flowchart illustrating a method for detecting storage controller workloads and dynamically splitting a backplane according to an embodiment of the present disclosure.

FIG. 3 illustrates a method for detecting storage controller workloads and dynamically splitting a backplane, starting at block 302. A predetermined split for storage drives on a backplane to storage controllers of an information handling is set in block 304 For example, a user of an information handling system may select from among several predetermined split configurations, such as by setting a user setting in a system BIOS/UEFI, or by affixing or removing a jumper from the backplane. The storage controllers are associates with the logical units of each of the storage drives based upon the selected predetermined split in block 306. Note that, as used herein, a logical unit may refer to the physical storage medium of a particular storage drive, to one or more storage volumes on the storage drive, to two or more storage drives that are associated together in a RAID configuration, or to another data storage configuration implemented on the storage drives. A BMC of the information handling system directs the storage controllers to obtain data storage traffic information in block 308. For example, BMC 260 can direct storage controllers 220 and 225 to collect data storage traffic information for a particular amount of time, such as for between 30 seconds and two minutes.

The BMC receives the data storage traffic information from the storage controllers in block 310. For example, BMC 260 can receive traffic information from storage controllers 220 and 225 in response to management transactions between I2C interfaces 262, 222, and 227, or BMC 260 can provide a second management transaction after the amount of time given for the data collection, and the storage controllers can retain the information until such time as the storage controllers receive the second management transaction. The BMC evaluates the received data storage traffic information in block 310, and a decision is made as to whether or not the evaluation indicated that a delta in the workloads of the storage controllers is less than a predetermined threshold in decision block 314. For example, backplane split configurator 264 can compare the data storage traffic information from storage controllers 220 and 225 to determine whether or not one of the storage controllers is handling a greater portion of the data storage workload for information handling system 200. If the evaluation indicated that a delta in the workloads of the storage controllers is less than a predetermined threshold, the "YES" branch of decision block 314 is taken and the method returns to block 308 where the BMC directs the storage controllers to obtain data storage traffic information.

If the evaluation indicated that a delta in the workloads of the storage controllers is not less than the predetermined threshold, the "NO" branch of decision block 314 is taken and the BMC determines a new split configuration in block 316. For example, backplane split configurator 264 can evaluate the data storage traffic information to determine another split under which the workloads are more balanced between storage controllers 220 and 225. The BMC provides an alert that the evaluation indicated that a delta in the workloads of the storage controllers is not less than the predetermined threshold in block 318. For example, BMC 260 can provide an alert to the management system external to information handling system 200. A decision is made as to whether or not a dynamic split mode is set in decision block 320. For example, information handling system 200 can be configured in a first, dynamic, mode, as described above. If the dynamic split mode is not set, the "NO" branch of decision block 320 is taken, the BMC schedules a task to implement the split at a later time, and a decision is made as to whether or not it is the scheduled time in decision block 324. If not, the "NO" branch of decision block 324 is taken and the method holds at the decision block until the scheduled time and the "YES" branch of the decision block is taken and the method proceeds to block 326, as described below.

Returning to decision block 320, if the dynamic split mode is set, the "YES" branch of the decision block is taken and the method proceeds to block 326. When either the dynamic mode is set, or the current time is the scheduled time, the BMC notifies the storage controller drivers to reflect the new mapping in of the new split configuration in decision block 326. For example, backplane split configurator 364 can communicate new mappings to processor complex 210 via I2C interfaces 212 and 262, and the system BIOS/UEFI can update the storage drivers for storage controllers 220 and 225. The BMC then provides the new mapping to the storage controllers in block 328. For example, backplane split configurator 364 can communicate the new mappings to storage controllers 220 and 225 via I2C interfaces 222, 227, and 262. The BMC then sets up an expander of the information handling system to implement the new split configuration in block 330 and the method returns to block 308 where the BMC directs the storage controllers to obtain data storage traffic information. For example, backplane split configurator 364 can communicate the new mappings to expander 230 via I2C interfaces 232 and 262.

Figure 4:
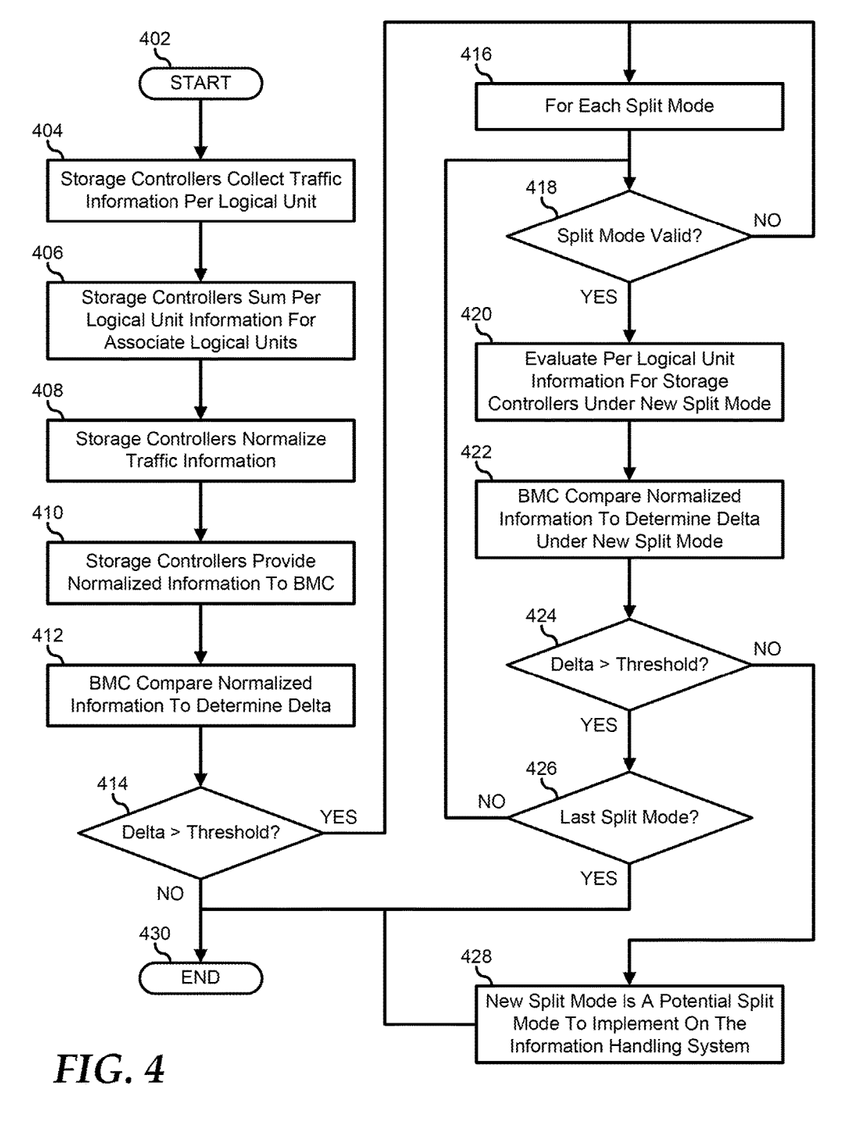
FIG. 4 is a flowchart illustrating a method for detecting storage controller workloads and dynamically splitting a backplane according to another embodiment of the present disclosure.

FIG. 4 illustrates another method for detecting storage controller workloads and dynamically splitting a backplane, starting at block 402. In particular, the flowchart of FIG. 4 illustrates a particular detailed embodiment of blocks 308 through 316 of FIG. 3. The storage controllers of an information handling system collect data storage traffic information on a per logical unit basis at for a specified duration in block 404. The storage controllers sum the per logical unit data storage traffic information for each logical unit together to obtain combined data storage traffic information for each respective storage controller in block 406. The storage controllers normalize the data storage traffic information with respect to the data colleting duration and the data collecting frequency in block 408. The storage controllers each provide their respective normalized data storage traffic information to a BMC of the information handling system in block 410. The BMC compares the normalized data storage traffic information from the storage controllers in block 412.

In decision block 414, a decision is made as to whether the deltas in the data storage traffic information between any of the storage controllers is greater than a predetermined threshold. If not, the "NO" branch of decision block 414 is taken and the method ends at block 430. If the deltas in the data storage traffic information between any of the storage controllers is greater than the predetermined threshold, the "YES" branch of decision block 414 is taken, and an iterative process is initiated for each possible backplane split in block 416. Considering a first possible backplane split, a decision is made as to whether or not the first backplane split is a valid split in decision block 418. Whether or not a particular backplane split is valid may be determined based upon a number of conditions, including whether the particular backplane split results in a performance degradation. For example, if a particular backplane split involves associating a high-performance storage drive with a storage controller that has a lower performance level, the particular backplane split may be deemed invalid. Other validity conditions include whether the particular backplane split involves associating a storage drive with an incompatible storage controller, or involves splitting a single drive across different storage controllers, as may be possible in some architectures and where a particular storage drive is partitioned into two or more logical units. If the first backplane split is not a valid split, the "NO" branch of decision block 418 is taken and the method returns to block 416 where a next possible backplane split is evaluated.

If the first backplane split is a valid split, the "YES" branch of decision block 418 is taken, the per logical unit data storage traffic information for each logical unit that are associated with each storage controller under the first backplane split are evaluated, such as by adding the traffic counts to project the workloads of the storage controllers under the backplane split in block 420. The projected workloads of the storage controllers are compared to determine if the deltas between the storage controllers under the new backplane split in block 422, and a decision is made as to whether the deltas under the new backplane split are greater than the predetermined threshold in decision block 424. If so, the "YES" branch of decision block 424 is taken and a decision is made as to whether the particular backplane split is the last backplane split in decision block 426. If not, the "NO" branch of decision block 426 is taken and the method returns to block 416 where a next possible backplane split is evaluated. If the particular backplane split is the last backplane split, the "YES" branch of decision block 426 is taken and the method ends in block 430 without having found a new valid backplane split. Returning to decision block 424, if the deltas under the new backplane split are not greater than the predetermined threshold, the "NO" branch is taken, and the new backplane split is designated as a potential backplane split for implementation on the information handling system in block 428, and the method ends at block 430. Note that the method of FIG. 4 may be modified to find several new valid backplane splits and to evaluate the several new valid backplane splits to determine a "best" new backplane split.

Note that in the foregoing description, it may be assumed that each storage controller of an information handling system has the same data storage bandwidth, and so comparisons are stated in terms of transaction numbers or in terms of the volume of data that each storage controller handles. However, it will be noted that not all storage controllers will have the same data storage bandwidth. Therefore, in other embodiments, comparisons and remappings performed between the storage controllers may be performed based upon various utilization metrics, such as a percent of max bandwidth, a percent of peak bandwidth, or another utilization metric. For example, a first storage controller with a max bandwidth of 500 megabits per second (mb/s) may be operating at a 90% utilization level (450 mb/s), and a second storage controller with a max bandwidth of 1 gigabits per second (gb/s) may be operating at a 90% utilization level (900 mb/s). Here, even though the utilization levels are the same, it may be advantageous to remap some of the logical units from the first storage controller to the second storage controller.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a plurality of storage drives configured as a plurality of logical units;
a first storage controller configured to map storage transactions on a first subset of the logical units;
a second storage controller configured to map data storage transactions on a second subset of the logical units, such that the first subset of logical units includes storage drives different than the second subset of logical units; and
a baseboard management controller (BMC) configured to:
direct the first storage controller to detect storage traffic to each logical unit of the first subset of logical units;
direct the second storage controller to detect storage traffic to each logical unit of the second subset of logical units;
sum the storage traffic to each logical unit of the first subset of logical units to determine a first storage traffic associated with the first storage controller;
sum the storage traffic to each logical unit of the second subset of logical units to determine a second storage traffic associated with the second storage controller;
compare the first storage traffic to the second storage traffic;
determine that the comparison of the first storage traffic and the second storage traffic indicates that the first storage traffic is greater than the second storage traffic by more than a predetermined threshold;
determine a third subset of logical units to be mapped to the first storage controller and a fourth subset of logical units to be mapped to the second storage controller, such that the third and fourth subsets of logical units includes different logical units than the first and second subsets of logical units;
sum the storage traffic to each logical unit of the third subset of logical units to determine a third storage traffic associated with the first storage controller;
sum the storage traffic to each logical unit of the fourth subset of logical units to determine a fourth storage traffic associated with the second storage controller;
compare the third storage traffic to the fourth storage traffic; and
remap the first storage controller to map storage transactions on the third subset of the logical units when the comparison of the third storage traffic and the fourth storage traffic indicates that the first storage traffic is greater than the second storage traffic by less than the predetermined threshold.

2. The information handling system of claim 1, the BMC further to:
remap the second storage controller to map storage transactions on the fourth subset of the logical units when the comparison of the third storage traffic and the fourth storage traffic indicates that the first storage traffic is greater than the second storage traffic by less than the predetermined threshold.

3. The information handling system of claim 2, further comprising:
an expander configured to couple the first set of logical units to the first storage controller and to couple the second set of logical units to the second storage controller.

4. The information handling system of claim 3, the BMC further to:
direct the expander to couple the third set of logical units to the first controller and to couple the fourth set of logical units to the second storage controller when the comparison indicates that the first storage traffic is greater than the second storage traffic by less than the predetermined threshold.

5. The information handling system of claim 2, further comprising:
a processor complex including a storage driver configured to map storage transactions on the first subset of logical units to the first storage controller and to map storage transactions on the second subset of logical units to the second storage controller.

6. The information handling system of claim 5, the BMC further to:
direct the processor complex to remap storage transaction on the third subset of logical units to the first storage controller and to remap storage transactions on the fourth subset of logical units to the second storage controller when the comparison indicates that the first storage traffic is greater than the second storage traffic by less than the predetermined threshold.

7. The information handling system of claim 1, wherein the first set of logical units and the second set of logical units are selected from among the plurality of storage logical units based upon the predetermined configuration of the information handling system.

8. An method, comprising:
mapping a first subset of logical units of a plurality of storage drives of an information handling system to a first storage controller of the information handling system;
mapping a second subset of logical units of the storage drives to a second storage controller of the information handling system, such that the first subset of logical units includes different logical units than the second subset of logical units;
directing, by a baseboard management controller (BMC) of the information handling system, the first storage controller to detect storage traffic to the first subset of logical units;
directing, by the BMC, the second storage controller to detect storage traffic to the second subset of logical units;
summing, by the BMC, the storage traffic to each logical unit of the first subset of logical units to determine a first storage traffic associated with the first storage controller;
summing, by the BMC, the storage traffic to each logical unit of the second subset of logical units to determine a second storage traffic associated with the second storage controller;
comparing, by the BMC, the first storage traffic to the second storage traffic;
determining, by the BMC, that the comparison of the first storage traffic and the second storage traffic indicates that the first storage traffic is greater than the second storage traffic by more than a predetermined threshold;
determining, by the BMC, a third subset of logical units to be mapped to the first storage controller and a fourth subset of logical units to be mapped to the second storage controller, such that the third and fourth subsets of logical units includes different logical units than the first and second subsets of logical units;
summing, by the BMC, the storage traffic to each logical unit of the third subset of logical units to determine a third storage traffic associated with the first storage controller;

summing, by the BMC, the storage traffic to each logical unit of the fourth subset of logical units to determine a fourth storage traffic associated with the second storage controller;
comparing by the BMC,e the third storage traffic to the fourth storage traffic; and
remapping, by the BMC, the first storage controller to map storage transactions on the third subset of the logical units when the comparison indicates that the first storage traffic is greater than the second storage traffic by less than the predetermined threshold.

9. The method of claim 8, the further comprising:
remapping, by the BMC, the second storage controller to map storage transactions on a fourth subset of the logical units when the comparison of the third storage traffic and the fourth storage traffic indicates that the first storage traffic is greater than the second storage traffic by less than the predetermined threshold.

10. The method of claim 9, further comprising:
configuring an expander to couple the first set of logical units to the first storage controller and to couple the second set of logical units to the second storage controller.

11. The method of claim 10, further comprising:
directing, by the BMC, the expander to couple the third set of logical units to the first storage controller and to couple the fourth set of logical units to the second storage controller when the comparison indicates that the first storage traffic is greater than the second storage traffic by less than the predetermined threshold.

12. The method of claim 9, further comprising:
configuring, in a processor complex of the information handling system, a storage driver to map storage transactions on the first subset of logical units to the first storage controller and to map storage transactions on the second subset of logical units to the second storage controller.

13. The method of claim 12, further comprising:
directing, by the BMC, the processor complex to remap storage transaction on the third subset of logical units to the first storage controller and to remap storage transactions on the fourth subset of logical units to the second storage controller when the comparison indicates that the first storage traffic is greater than the second storage traffic by less than the predetermined threshold.

14. The method of claim 8, wherein the first set of logical units and the second set of logical units are selected from among the plurality of logical units based upon tithe predetermined configuration of the information handling system.

15. An information handling system, comprising:
a plurality of storage drives configured as a plurality of logical units;
a first storage controller configured to map data storage transactions on a first subset of the logical units;
a second storage controller configured to map data storage transactions on a second subset of the logical units, such that the first subset of logical units includes different logical units than the second subset of logical units; and
a processor complex configured to:
direct the first storage controller to detect storage traffic to each logical unit of the first subset of logical units;
direct the second storage controller to detect storage traffic to each logical unit of the second subset of logical units;

sum the storage traffic to each logical unit of the first subset of logical units to determine a first storage traffic associated with the first storage controller;

sum the storage traffic to each logical unit of the second subset of logical units to determine a second storage traffic associated with the second storage controller;

compare the first storage traffic to the second storage traffic;

determine that the comparison of the first storage traffic and the second storage traffic indicates that the first storage traffic is greater than the second storage traffic by more than a predetermined threshold;

determine a third subset of logical units to be mapped to the first storage controller and a fourth subset of logical units to be mapped to the second storage controller, such that the third and fourth subsets of logical units includes different logical units than the first and second subsets of logical units;

sum the storage traffic to each logical unit of the third subset of logical units to determine a third storage traffic associated with the first storage controller;

sum the storage traffic to each logical unit of the fourth subset of logical units to determine a fourth storage traffic associated with the second storage controller;

compare the third storage traffic to the fourth storage traffic; and remap the first storage controller to map storage transactions on a third subset of the logical units when the comparison indicates that the first storage traffic is greater than the second storage traffic by less than the predetermined threshold.

16. The information handling system of claim 15, the processor complex further to:

remap the second storage controller to map storage transactions on a fourth subset of the logical units when the comparison indicates that the first storage traffic is greater than the second storage traffic by less than the predetermined threshold.

* * * * *

UNITED STATES PATENT AND TRADEMARK OFFICE
CERTIFICATE OF CORRECTION

PATENT NO.        : 10,437,477 B2                                    Page 1 of 1
APPLICATION NO.   : 15/655294
DATED             : October 8, 2019
INVENTOR(S)       : Chandrashekar Nelogal et al.

It is certified that error appears in the above-identified patent and that said Letters Patent is hereby corrected as shown below:

In the Claims

Column 15, Line 23: in Claim 7, Please change "plurality of storage logical units" to -- plurality of logical units --

Column 16, Line 50: in Claim 14, Please change "upon tithe" to -- upon the --

Signed and Sealed this
Seventeenth Day of March, 2020

Andrei Iancu
*Director of the United States Patent and Trademark Office*